(12) United States Patent
Hillenbrand et al.

(10) Patent No.: US 6,504,383 B1
(45) Date of Patent: Jan. 7, 2003

(54) DEVICE FOR MONITORING WELDS

(75) Inventors: Siegfried Hillenbrand, Achalmstrasse 110, Albstadt (DE); Wolfgang Adamitzki, Oelsnitz (DE)

(73) Assignee: Siegfried Hillenbrand, Albstadt (DE)

(*) Notice: Subject to any disclaimer, the term of this patent is extended or adjusted under 35 U.S.C. 154(b) by 0 days.

(21) Appl. No.: 09/743,265
(22) PCT Filed: Jul. 8, 1999
(86) PCT No.: PCT/DE99/02109
§ 371 (c)(1),
(2), (4) Date: Mar. 12, 2001
(87) PCT Pub. No.: WO00/02696
PCT Pub. Date: Jan. 20, 2000

(30) Foreign Application Priority Data

Jul. 8, 1998 (DE) .......................................... 198 30 492

(51) Int. Cl.⁷ .............................................. G01R 27/04
(52) U.S. Cl. ...................................... 324/637; 324/71.1
(58) Field of Search ................................ 324/71.1, 637, 324/639, 642

(56) References Cited

U.S. PATENT DOCUMENTS 3,624,496 A * 11/1971 Feinstein .................... 324/71.1

FOREIGN PATENT DOCUMENTS

| EP | 0 126 703 | * 11/1984 |
| EP | 0 320 442 A2 | 6/1989 |
| GB | 2 052 760 | * 1/1981 |

OTHER PUBLICATIONS

Ren–Chyuan Luo et al., "Sensors for Cleaning Castings with Robot and Plasma–arc", Robotics Research Center, University of Rhode Island, pp. 217–224.
Charles Umeagukwa et al., "Robotic Acoustic Seam Tracking: System Development and Application", IEEE Transactions on Industrial Electronics, vol. 36, No. 3, Aug. 1989, pp. 338–348.

* cited by examiner

*Primary Examiner*—Christine K. Oda
(74) *Attorney, Agent, or Firm*—Crowell & Moring LLP

(57) ABSTRACT

A device for monitoring welds is provided. The device can be used during a welding operation without interfering with the welding and can be located in the direct vicinity of the weld. This is achieved using a radar sensor.

16 Claims, 1 Drawing Sheet

DEVICE FOR MONITORING WELDS

BACKGROUND AND SUMMARY OF THE INVENTION

The invention relates to a welding system having a monitoring device.

Normally, in industrial manufacturing, welding operations are carried out semi-automatically or fully automatically by means corresponding automatic welding machines. The welding operation itself can be carried out by means of different welding tools, for example, welding torches or by means of lasers. In each case, it is desirable to control the welding result.

During the control of welding operations, particularly when point welding and stud welding, it has been attempted to carry out a monitoring on the basis of ultrasound. This leads to results which so far have not been satisfactory. Other measuring devices, such as laser vibrometers or similar devices, on the one hand, require high expenditures and, on the other hand, are very sensitive with respect to environmental influences, such as smoke, dust, sparks, etc.

In many welding processes, for example, during resistance welding or arc welding, the monitoring of the welding quality is therefore advantageous.

For this reason, welding systems already exist which have a monitoring device (UMEAGUKWU, C. et al.; Robotic Acoustic Seam Tracking: System Development and Application; IEEE Transactions on Industrial Electronics; Vol. 36; No. 3; P. 338–348; 1989). However, these require comparatively high expenditures and are relatively sensitive to outside environmental influences.

It is therefore an object of the invention to suggest a system by means of which a welding operation can be monitored without any high expenditures and without any contact, which welding operation is insensitive to outside environmental influences.

This object is achieved by a welding system having a monitoring device, comprising a radar sensor which has a transmitter and receiver for transmitting and receiving electromagnetic radiation in the radar and/or microwave range As a result of the measures indicated in the subclaims, advantageous embodiments and further developments of the invention can be obtained.

Correspondingly, a system according to the invention is characterized in that a radar sensor is provided which has a transmitter and a receiver for sending and receiving electromagnetic radiation in the microwave and/or radar emission range.

Such a radar sensor has a sufficiently high local resolution in order to reliably detect welds of a conventional dimensioning. Since most of the materials are transparent for the radiation of the indicated wave range, a radar sensor is insensitive with respect to exterior environmental influences, such as contaminations, vapors, dust, smoke, light flashes, etc., in the area of the weld. Furthermore, a radar sensor is independent of the light conditions. In particular, it is completely insensitive to the laser radiation frequently used for welding operations.

For analyzing the received signal, reference measurements during a correct welding operation can be taken and the measured data can be collected as reference data in corresponding memory unit. According to the requirements with respect to the quality of the weld, corresponding tolerance criteria can be provided for the different detection parameters, such as the intensity or frequency of the reflection radiation, within which the measured signal corresponds to a correct weld of a desired quality.

In the event of an intolerable deviation of the measured signal from the reference signal, different reactions can take place. Either the welding operation can be controlled or regulated by means of a control value obtained on the basis of the measured data, or the recorded measured data are used for recognizing rejects which can be marked correspondingly. In the event of a faulty weld, it would also be possible to only stop the automatic welding machine and optionally generate a signal until the operator again adjusts the correct welding parameters. Other usage possibilities of the measured signal from the radar sensor exist according to the application.

In an advantageous further development of the invention, the radar sensor and/or the objects to be welded together are arranged such that a relative movement can take place between these two components. As a result, depending on the extent and direction of the relative movement, a Doppler shift of the frequency of the transmitted signals with respect to the received signal takes place. By means of a corresponding analyzing unit for detecting this frequency difference, a frequency spectrum is obtained which is not only dependent on the relative speed of the sensor or of the reflection surface but is also a function of different parameters of the reflection surface, for example, of the shape of the material. This frequency spectrum is therefore also significant for the quality of the weld measured thereby.

In an advantageous further development of the invention, the radar sensor and at least partially the welding tool are fastened on a common holding device. As a result, a space-saving arrangement is obtained, in which case the sensor for controlling the quality of the weld is arranged in the immediate proximity of the weld. According to the application, a possible movement of the welding tool can simultaneously be used as an advance of the radar sensor with respect to the weld to be measured in order to evaluate the Doppler signal, as indicated above.

Also without a controlled relative movement between the radar sensor and the weld, the use of a Doppler radar sensor is advantageous because, as a result of the welding itself, various effects, such as vibrations, etc., are triggered which cause a corresponding Doppler shift.

In a further development of the invention, a waveguide is additionally mounted on the radar sensor. Similar to known optical waveguides, such a waveguide may consist of a solid material or may be constructed as a hollow waveguide. In the case of a corresponding temperature stability, a waveguide can be brought into the immediate proximity of the weld. In this case, the waveguide is preferably constructed as a metallic or ceramic hollow waveguide. For this purpose, a ceramic hollow waveguide is provided with corresponding conducting elements. Surface coatings, the working-in of wire mesh, etc., can, for example, be used.

Such a temperature-stable waveguide can be brought significantly closer into the area of the hot weld than a radar sensor which is temperature-sensitive because of the necessarily existing electronic components.

In a preferred embodiment of the invention, a focussing element is also mounted on the radar sensor and/or on the output of an above-indicated waveguide. Such a focussing element can be mounted, for example, in the form of a so-called horn-shaped emitter or in the form of a radar lens. If the welding operation is to be observed in the direct proximity of the weld, attention should also be paid in this case to the temperature stability of the focussing element.

Because of the currently known materials, a metallic hornshaped emitter will therefore be preferable to a lens. However, it is definitely possible that, on the basis of future materials, lenses will also be available which have the corresponding temperature stability.

The advantages of the focussing are that essentially the actually observable weld is situated in the coverage range of the radiation of the radar sensor and this weld therefore exercises the predominant influence on the response signal. Changes in the course of the weld are therefore indicated correspondingly more clearly in the response signal of the radar sensor.

The transmission frequency of the radar sensor is preferably selected to be narrow-band. Definitely, several frequencies can be used with a corresponding spacing. As a result, while utilizing a relative movement between the radar sensor and the objects to be welded together, a Doppler spectrum will have a higher informative value because there can be no superimposing of response signals from different transmission frequencies.

Furthermore, it is recommended to adapt the wavelength of the transmitted signal to the width of the weld to be measured. In this case, the wavelength should be in the range of the weld width or below in order to ensure a sufficient local resolution.

By means of the invention, all possible weld formations can be monitored, particularly also weld points and weld seams.

By means of a radar sensor, the weld and its environment is monitored, for example, with respect to movement and vibrations, which can be detected particularly by means of the Doppler radar. Simultaneously, by means of this operation, the welding system itself, for example, during electro-welding, the electrode geometry and the electrode movement, can be monitored. This permits an additional process control in order to recognize damage and wear of the welding system, particularly of electrodes, early.

Simultaneously, in addition to controlling the quality of the weld, the monitoring of the exact position of the parts to be welded together is permitted. Thus, for example, during stud welding, the stud position and the stud geometry can be simultaneously monitored. Also this examining method is based, among other things, on an analysis of surface vibrations of the parts to be welded together, for example, of a sheet metal part during the welding operation.

When a welding operation is considered in detail, the following individual steps may, for example, be obtained:

1. The parts to be welded together, such as metal sheet or other metallic parts, are positioned between, for example, rod-shaped electrodes, and the welding operation is triggered.
2. The two electrodes move toward one another and contact the parts at a defined maximal pressure.
3. The energizing of the electrodes takes place shortly after the contact and is controlled by way of the electrode position.
4. As a result of the high current density and the corresponding material resistance, the material becomes very hot locally and deforms; that is, it becomes plastic and possibly even liquid.
5. The electrodes are guided to follow, the penetration depth of the electrodes normally being used as the control parameter for the welding operation. In addition, this penetration depth, as a rule, is mechanically limited.
6. Subsequently, the current supply is switched off and the electrodes, which move apart, release the welded-together part.

During these operations, that is, particularly during the contacting and the releasing of the welded-together part or of the parts to be welded together by the electrodes, vibrations are caused or influenced predominantly when welding sheet metal.

Thus, the material vibrations, for example, typically vary with respect to time during the buildup of the contact pressure forces in the surroundings of the electrode contacting. During the plasticizing or the liquefying of the material, this vibration is abruptly damped and is therefore also clearly influenced. During the moving-apart of the electrodes and the connected hardening of the weld, vibrations occur again which clearly differ from the preceding signals of the unwelded parts.

These vibration processes of the welded parts or metal sheets in the vicinity of the weld can be tracked without contact by means of the radar sensor and can be analyzed by means of the corresponding analyzing unit.

The variation of the vibrations at the welded parts or metal sheets takes place as in other welding processes, for example, during arc welding, which is frequently used for welding studs onto sheet metal parts.

Another embodiment of the invention consists of causing the area of the weld to vibrate as a result of independent excitation before, during or after the welding-together and of observing these vibrations by means of one or several radar sensors. If parts are not welded together or are not optimally welded together, a vibration behavior occurs in this case which differs from a correct welding-together and which is reflected in the corresponding sensor signal.

This independent excitation can be used, for example, during point welding, in which the entire welding operation takes place very rapidly and the vibrations caused thereby decay relatively fast. As a result of the independent excitation, a weld can still be checked also at a later point in time after the decaying of the vibrations triggered during the welding.

Beyond the observation of the vibration behavior, by means of a radar sensor, the change of the reflection surface during the welding operation can also be observed directly. Thus, during the transition of the rigid partial areas to be welded to one another into the plastic phase or molten phase, a corresponding significant change in the radar signal takes place in the area of the weld. The surface of the weld, in turn, changes during the cooling and solidifying which itself is again indicated in the sensor signal of the radar sensor.

An embodiment of the invention is illustrated in the drawing and will be explained in detail in the following by means of the figure.

DETAILED DESCRIPTION OF THE DRAWING

The system 1 is situated above two metal sheets 2, 3 which are to be connected by means of a welding system, which is not shown in detail, by way of a weld seam 4.

Figure 1A:
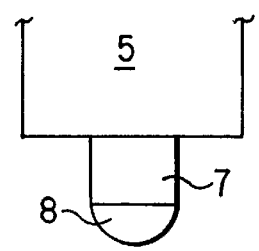
FIG. 1A is an alternate embodiment illustrating the waveguide with a lens.
Figure 1:
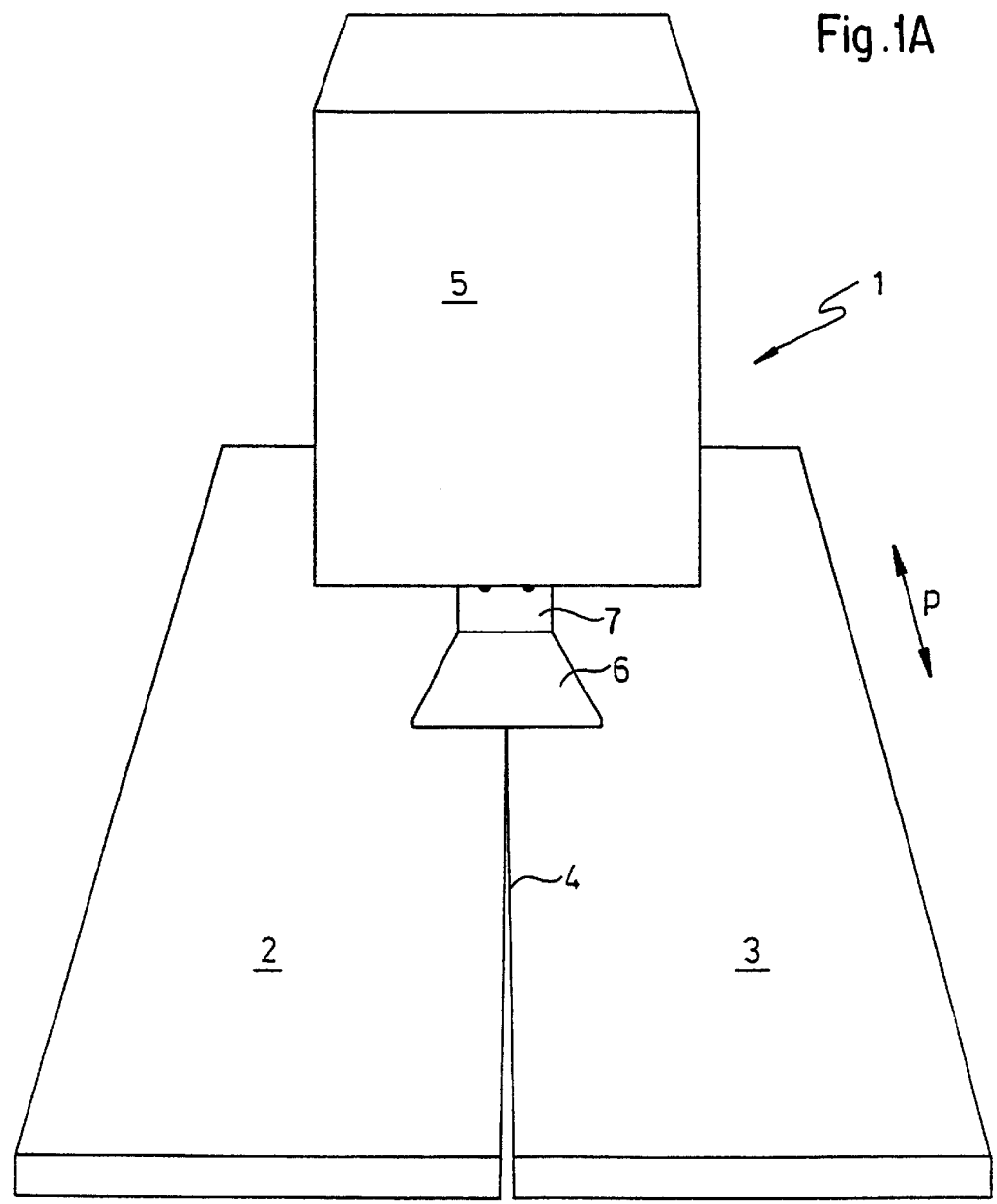
FIG. 1 is a schematic representation of a monitoring device according to the invention.

A radar sensor 5, which, in a manner not shown in detail, contains a transmitter as well as a receiver for transmitting and receiving the desired electromagnetic radiation, is situated above the weld seam 4. The above-mentioned welding system can be arranged, for example, hidden by the radar sensor 5, behind this radar sensor 5. This radar sensor 5 is equipped with a waveguide 7 and a horn-type antenna 6 which is aimed at a weld seam 4. FIG. 1A illustrates the radar sensor with a waveguide 7 and a radar lens 8 instead of the horn-type antenna.

By way of connection elements, which are not shown in detail, the radar sensor 5 is connected with a corresponding analyzing unit and optionally with the control of the welding system.

Although the monitoring of the welding operation can also take place by means of a radar sensor 5 which is in a relationship with the weld seam 5, it was found to be useful to use the so-called Doppler signal for the analysis, which Doppler signal is the result of a relative movement between the radar sensor 5 and the weld seam 4. For this purpose, in the described embodiment, either the radar sensor 5 or the two metal sheets 2, 3 are moved parallel to the weld seam 4 (compare double arrow P), so that a corresponding frequency shift occurs. This effect is promoted by the fact that, although the radar sensor 5 is situated in a plane which intersects the weld seam 4 and is perpendicular with respect to the metal sheets 2, 3, the radar sensor 4 is not aimed perpendicularly at the weld seam 4. The more acute the viewing angle of the radar sensor 5 or of the horn-type antenna 6 with respect to the weld seam 4, the larger the effect of a relative movement in the form of a Doppler shift of the received signal.

Different transmission frequencies are used according to the type of the weld seams. For finer laser weld seams, for example, wavelengths in the mm-range (that is, in a frequency range in the proximity of 100 GHz) are suitable; for rougher weld seams of widths of several centimeters, wavelengths in the order of 1 cm (that is, in the range of 30 GHz) are suitable and sufficient.

If the holding device for the welding tool, for example, for a laser lens system, also carries the radar sensor, optimally short intervals are achieved with correspondingly short delay times between the welding and the checking. The radar sensor does not interfere with the welding operation irrespective of the type of the welding tool. The site of the observation can therefore be directly behind the weld, that is, the melting zone of the material to be welded together.

It is even conceivable to directly observe the melting zone of the material melting-together during the welding.

In both cases, clear signals can be generated during a faulty behavior, for example, when the material is not welded together or is spattered, in comparison to a good weld seam. If the melding zone is observed, the boiling of the molten mass or its atomizing can be observed directly.

The measuring, that is, the transmitting and receiving of the radar and/or microwave radiation can take place continuously. According to the type of analysis of the signal, however, a certain time can therefore be required, so that the monitoring of the welding operation takes place by a succession of analysis cycles. By means of correspondingly short measuring time intervals, which can be obtained, for example, by means of a correspondingly dimensioned computer power, a quasi-continuous measuring can also take place in such a case.

The signal analysis itself can be carried out by means of all known and future processes of low-frequency alternating-voltage characterization and their classification.

List of reference numbers 1 system
2 metal sheet
3 metal sheet
4 weld seam
5 radar sensor
6 horn-type antenna

What is claimed is:

1. Welding system having a welding tool and a monitoring device, the monitoring device comprising a radar sensor which has a transmitter and receiver for transmitting and receiving electromagnetic radiation in the radar and/or microwave range, wherein the radar sensor is movable with respect to an object along a weld seam, which weld seam is made by the welding tool.

2. System according to claim 1, wherein an automatic control of the welding system is provided via the radar sensor signal.

3. System according to claim 1, further comprising a defect detector for detecting defects in the weld seam using the radar sensor.

4. System according to claim 1, wherein the radar sensor and/or objects to be welded together are movably arranged with respect to one another.

5. System according to claim 1, wherein the radar sensor and at least partially the welding tool are fastened to a common holding device.

6. System according to claim 1, wherein an analysis unit is provided for analyzing a frequency shift between the transmitted and received signal.

7. System according to claim 1, wherein a waveguide is provided.

8. System according to claim 7, wherein the waveguide is a metallic or ceramic hollow waveguide.

9. System according to claim 1, wherein a focussing element is provided for focussing the electromagnetic radiation on the weld.

10. System according to claim 9, wherein the focussing element comprises one of a horn-shaped emitter and a radar lens.

11. System according to claim 1, wherein a transmission frequency is used which is of a narrow-band with respect to the frequency shift to be expected.

12. System according to claim 1, wherein the wavelength of the emitted radiation is in the order of the width of the weld or smaller.

13. System according to claim 1, wherein an analysis of vibrations is provided in the area of the weld.

14. System according to claim 1, wherein a vibration generator is provided for exciting mechanical vibrations of the parts to be welded together or of the welded-together parts in the area of the weld.

15. Method of welding, wherein a system according to claim 1, is used.

16. A welding system, comprising:
    a welding tool; and
    a monitoring device, the monitoring device comprising a radar sensor which has a transmitter and receiver for transmitting and receiving electromagnetic radiation in the radar and/or microwave range, wherein the radar sensor is movable with respect to an object along a weld seam, which weld seam is made by the welding tool.

* * * * *